US006908673B2

(12) United States Patent
Castellani et al.

(10) Patent No.: US 6,908,673 B2
(45) Date of Patent: Jun. 21, 2005

(54) CABLE WITH RECYCLABLE COVERING

(75) Inventors: Luca Castellani, Corsico (IT); Luca Martinotto, Legnano (IT); Cristiana Scelza, Lucania (IT); Enrico Albizzati, Lesa (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/312,407

(22) PCT Filed: Jun. 15, 2001

(86) PCT No.: PCT/EP01/06820

§ 371 (c)(1), (2), (4) Date: Dec. 26, 2002

(87) PCT Pub. No.: WO02/03398

PCT Pub. Date: Jan. 10, 2002

(65) Prior Publication Data

US 2003/0138628 A1 Jul. 24, 2003

Related U.S. Application Data

(60) Provisional application No. 60/216,032, filed on Jul. 3, 2000.

(30) Foreign Application Priority Data

Jun. 28, 2000 (EP) ........................................... 00113661

(51) Int. Cl.$^{7}$ ............................ B32B 15/00; H01B 9/02

(52) U.S. Cl. ................ 428/379; 428/383; 174/110 PM; 174/120 SR; 525/333.7

(58) Field of Search ....................... 525/333.7; 428/379, 428/383; 174/120 SR, 110 PM

(56) References Cited

U.S. PATENT DOCUMENTS

| | | | | |
|---|---|---|---|---|
| 4,330,439 A | | 5/1982 | Nishimatsu et al. | |
| 4,543,207 A | | 9/1985 | Sato et al. | |
| 4,621,302 A | | 11/1986 | Sato et al. | |
| 4,857,673 A | * | 8/1989 | Wilkus et al. | 174/110 PM |
| 5,017,733 A | | 5/1991 | Sato et al. | |
| 5,192,463 A | | 3/1993 | Berger et al. | |
| 5,446,228 A | | 8/1995 | Commandeur et al. | |
| 5,545,355 A | | 8/1996 | Commandeur et al. | |
| 5,601,755 A | | 2/1997 | Commandeur et al. | |
| 6,001,933 A | * | 12/1999 | Tsuruoka et al. | 525/232 |
| 6,277,925 B1 | * | 8/2001 | Biswas et al. | 525/333.7 |
| 2003/0138628 A1 | * | 7/2003 | Castellani et al. | 428/375 |

FOREIGN PATENT DOCUMENTS

| | | |
|---|---|---|
| EP | 0 987 718 A1 | 3/2000 |
| WO | WO 98/32137 | 7/1998 |
| WO | WO 98/52197 | 11/1998 |
| WO | WO 99/13477 | 3/1999 |
| WO | WO 00/41187 | 7/2000 |
| WO | WO 01/37289 A1 | 5/2001 |

OTHER PUBLICATIONS

REXFLEX Product Data Sheets, Huntsman Corp. undated.*

* cited by examiner

*Primary Examiner*—Rena Dye
*Assistant Examiner*—J. M. Gray
(74) *Attorney, Agent, or Firm*—Finnegan, Henderson, Farabow, Garrett & Dunner, L.L.P.

(57) ABSTRACT

A cable with recyclable covering, particularly for transporting or distributing medium or high voltage energy, in which at least one covering layer is based on a thermoplastic polymer material of a propylene homopolymer or a copolymer of propylene with ethylene or an $\alpha$-olefin other than propylene in mixture with a dielectric liquid. The cable possesses superior mechanical and electrical properties, including high dielectric strength, in particular enabling it to be used at high operating temperature.

51 Claims, 1 Drawing Sheet

CABLE WITH RECYCLABLE COVERING

CROSS REFERENCE TO RELATED APPLICATIONS

This application is a national phase application based on PCT/EP01/06820, filed Jun. 15, 2001, the content of which is incorporated herein by reference, and claims the priority of European Patent Application No. 00113661.3, filed Jun. 28, 2000, the content of which is incorporated herein by reference, and claims the benefit of U.S. Provisional Application Ser. No. 60/216,032, filed Jul. 3, 2000, the content of which is incorporated herein by reference.

BACKGROUND OF THE INVENTION

1. Field of the Invention

The present invention relates to a cable with recyclable covering. In particular, the invention relates to a cable for transporting or distributing medium or high voltage electric energy, wherein an extruded covering layer based on a thermoplastic polymer material is admixture with a dielectric liquid with superior mechanical and electrical properties is present, enabling, in particular, the use of high operating temperatures and the transportation of high power energy.

2. Description of the Related Art

The requirement for products of high environmental compatibility, composed of materials which, in addition to not being harmful to the environment during production or utilization, can be easily recycled at the end of their life, if now fully accepted in the field of electrical and telecommunications cables.

However the use of materials compatible with the environment is conditioned by the need to limit costs while, for the more common uses, providing a performance equal to or better than that of conventional materials.

In the case of cables for transporting medium and high voltage energy, the various coverings surrounding the conductor commonly consist of polyolefin-based crosslinked polymer, in particular crosslinked polyethylene (XLPE), or elastomeric ethylene/propylene (EPR) or ethylene/propylene/diene (EPDM) copolymers, also crosslinked. The crosslinking, effected after the step of extrusion of the polymeric material onto the conductor, gives the material satisfactory performance even under hot conditions during continuous use and with current overload.

It is well known however that crosslinked materials cannot be recycled, so that manufacturing wastes and the covering material of cables which have reached the end of their life can be disposed of only by incineration.

Electric cables are also known having their insulation consisting of a multi-layer wrapping of a paper or paper/polypropylene laminate impregnated with a large quantity of a dielectric liquid (commonly known as mass impregnated cables or also oil-filled cables). By completely filling the spaces present in the multi-layer wrapping, the dielectric liquid prevents partial discharges arising with consequent perforation of the electrical insulation. As dielectric liquids products are commonly used such as mineral oils, polybutenes, alkylbenzenes and the like (see for example U.S. Pat. No. 4,543,207, U.S. Pat. No. 4,621,302, EP-a-0987718, WO 98/32137).

It is however well known that mass impregnated cables have numerous drawbacks compared with extruded insulation cables, so that their use is currently restricted to specific fields of application, in particular to the construction of high and very high voltage direct current transmission lines, both for terrestrial and in particular for underwater installations. In this respect, the production of mass impregnated cables is particularly complex and costly, both for the high cost of the laminates and for the difficulties encountered during the steps of wrapping the laminate and then of impregnating it with the dielectric liquid. In particular, the dielectric liquid used must have low viscosity under cold conditions to allow rapid and uniform impregnation, while at the same time it must have a low tendency to migrate during installation and operation of the cable to prevent liquid loss from the cable ends or following breakage. In addition, mass impregnated cables cannot be recycled and their use is limited to an operating temperature of less than 90° C.

Within non-crosslinked polymeric materials, it is known to use high density polyethylene (HDPE) for covering high voltage cables. HDPE has however the drawback of a lower temperature resistance than XLPE, both to current overload and during operation.

Thermoplastic low density polyethylene (LDPE) insulating coverings are also used in medium and high voltage cables: again in this case; these coverings are limited by too low an operating temperature (about 70° C.).

WO 99/13477 describes an insulating material consisting of a thermoplastic polymer forming a continuous phase which incorporates a liquid or easily meltable dielectric forming a mobile interpenetrating phase within the solid polymer structure. The weight ratio of thermoplastic polymer to dielectric is between 95:5 and 25:75. The insulating material can be produced by mixing the two components while hot either batchwise or continuously (for example by means of an extruder). The resultant mixture is then granulated and used as insulating material for producing a high voltage electric cable by extrusion onto a conductor. The material can be used either in thermoplastic or crosslinked form. As thermoplastic polymers are indicated: polyolefins, polyacetates, cellulose polymers, polyesters, polyketones, polyacrylates, polyamides and polyamines. The use of polymers of low crystallinity is particularly suggested. The dielectric is preferably a synthetic or mineral oil of low or high viscosity, in particular a polyisobutene, naphthene, polyaromatic, $\alpha$-olefin or silicone oil.

The Applicant considers as still unsolved the technical problem of producing an electric cable with a covering made from a thermoplastic polymer material having mechanical and electric properties comparable to those of cables with an insulating covering of crosslinked material. In particular, the Applicant has considered the problem of producing a cable with a non-crosslinked insulating covering having good flexibility and high mechanical strength under both hot and cold conditions, while at the same time possessing high dielectric strength, without using products potentially polluting during the life cycle of the cable, i.e. from its production to its disposal.

In view of said problem, the Applicant considers that the addition of dielectric liquids to polymer materials as proposed in the cited WO 99/13477 gives totally unsatisfactory results. In this respect, the Applicant maintains that adding a dielectric liquid to an insulating material should both determine a significant increase in its electrical properties (in particular its dielectric strength), without changing the material characteristics (thermomechanical properties, manageability) and without resulting in exudation of the dielectric liquid. In particular, the resultant cable should give substantially constant performance with time and hence high reliability, even at high operating temperatures (at least 90° C. and beyond).

SUMMARY OF THE INVENTION

The Applicant has now found it possible to solve said technical problem by using, an recyclable polymer base material, a thermoplastic propylene homopolymer or copolymer mixed with a dielectric liquid as hereinafter defined. The resultant composition possesses good flexibility even when cold, excellent thermomechanical strength and high electrical performance, such as to make it particularly suitable for forming at least one covering layer, and in particular an electrical insulating layer, of a medium or high voltage cable of high operating temperature, of at least 90° C. and beyond. The dielectric liquid suitable for implementing the invention has high compatibility with the base polymer and high efficiency in the sense of improving electrical performance, consequently allowing the use of small quantities of additive such as not to impair the thermomechanical characteristics of the insulating layer.

High compatibility between the dielectric liquid and the base polymer ensures homogeneous dispersion of the liquid in the polymer matrix and improves cold behaviour of the polymer. Moreover, as the dielectric liquid suitable for forming the cable of the invention is free of polar groups, it absorbs water in extremely small quantities, hence preventing formation of insulation defects due to the presence of steam which normally forms during the process of high temperature extrusion.

According to a first aspect, the invention therefore relates to a cable (1) comprising at least one electrical conductor (2) and at least one extruded covering layer (3, 4, 5) based on a thermoplastic polymer material in admixture with a dielectric liquid, wherein:

- said thermoplastic material comprises a propylene homopolymer or a copolymer of propylene with at least an olefin comonomer selected from ethylene and an α-olefin other than propylene, said homopolymer or copolymer having a melting point greater than or equal to 140° C. and a melting enthalpy of from 30 to 100 J/g;
- said liquid comprises at least one alkylaryl hydrocarbon having at least two non-condensed aromatic rings and a ratio of number of aryl carbon atoms to total number of carbon atoms greater than or equal to 0.6, and preferably greater than or equal to 0.7.

According to a first embodiment, said extruded covering layer based on said thermoplastic polymer material in admixture with said dielectric liquid is an electrically insulating layer.

According to a further embodiment, said extruded covering layer based on said thermoplastic polymer material in admixture with said dielectric liquid is a semiconductive layer.

Preferably, the propylene homopolymer or copolymer has a melting point of from 145 to 170° C.

Preferably, the propylene homopolymer or copolymer has a melting enthalpy of from 30 to 85 J/g.

Preferably, the propylene homopolymer or copolymer has a flexural modulus, measured in accordance with ASTM D790, at room temperature, of from 30 to 1400 MPa, and more preferably from 60 to 1000 MPa.

Preferably, the propylene homopolymer or copolymer has a melt flow index (MFI), measured at 230° C. with a load of 21.6 N in accordance with ASTM D1238/L, of from 0.05 to 10.0 dg/min, more preferably from 0.5 to 5.0 dg/min.

If a copolymer of propylene with an olefin comonomer is used, this latter is preferably present in a quantity of less than or equal to 15 mol %, and more preferably of less than or equal to 10 mol %. The olefin comonomer is, in particular, ethylene or an α-olefin of formula $CH_2{=}CH{-}R$, where R is a linear or branched $C_2$–$C_{10}$ alkyl, selected for example from: 1-butene, 1-pentene, 4-methyl-1-pentene, 1-hexene, 1-octene, 1-decene, 1-dodecene and the like, or combinations thereof. Propylene/ethylene copolymers are particularly preferred.

Preferably, said thermoplastic material is selected from:

a) a propylene homopolymer or a copolymer of propylene with at least one olefin comonomer selected from ethylene and an α-olefin other than propylene, having a flexural modulus generally of from 30 to 900 MPa, and preferably of from 50 to 400 MPa;

b) a heterophase copolymer comprising a thermoplastic phase based on propylene and an elastomeric phase based on ethylene copolymerized with an α-olefin, preferably with propylene, in which the elastomeric phase is present in a quantity of at least 45 wt % on the total weight of the heterophase copolymer.

The homopolymers or copolymers of class a) show a single-phase microscopic structure, i.e. substantially devoid of heterogeneous phases dispersed as molecular domains of size greater than one micron. These materials do not show in fact the optical phenomena typical of heterophase polymer materials, and in particular are characterised by better transparency and reduced whitening due to local mechanical stresses (commonly known as "stress whitening").

Particularly preferred of said class a) is a propylene homopolymer or a copolymer of propylene with at least one olefin comonomer selected from ethylene and an α-olefin other than propylene, said homopolymer or copolymer having:

- a melting point of from 140 to 165° C.;
- a melting enthalpy of from 30 to 80 J/g;
- a fraction soluble in boiling diethyl ether in an amount of less than or equal to 12 wt %, preferably from 1 to 10 wt %, having a melting enthalpy of less than or equal to 4 J/g, preferably less than or equal to 2 J/g;
- a fraction soluble in boiling n-heptane in an amount of from 15 to 60 wt %, preferably from 20 to 50 wt %, having a melting enthalpy of from 10 to 40 J/g, preferably from 15 to 30 J/g; and
- a fraction insoluble in boiling n-heptane in an amount of from 40 to 85 wt %, preferably from 50 to 80 wt %, having a melting enthalpy of greater than or equal to 45 J/g, preferably from 50 to 95 J/g.

Further details of these materials and their use in covering cables are given in European patent application 99122840 filed on Nov. 17, 1999 in the name of Applicant, incorporated herein for reference.

The heterophase copolymers of class b) are thermoplastic elastomers obtained by sequential copolymerization of: i) propylene, possibly containing minor quantities of at least one olefin comonomer selected from ethylene and an α-olefin other than propylene; and then of: ii) a mixture of ethylene with an α-olefin, in particular propylene, and possibly with minor portions of a diene. This class of product is also commonly known by the term "thermoplastic reactor elastomers".

Particularly preferred of the said class b) is a heterophase copolymer in which the elastomeric phase consists of an elastomeric copolymer of ethylene and propylene comprising from 15 to 50 wt % of ethylene and from 50 to 85 wt % of propylene on the weight of the elastomeric phase. Further details of these materials and their use in covering cables are given in European patent application 98830800 filed on Dec. 30, 1998 in the name of the Applicant, incorporated herein for reference.

Products of class a) are available commercially for example under the trademark Rexflex[R] of the Huntsman Polymer Corporation.

Products of class b) are available commercially for example under the trademark Hifax[R] of Montell.

Alternatively, as thermoplastic base material, a propylene homopolymer or copolymer as hereinabove defined can be used in mechanical mixture with a low crystallinity polymer, generally with a melting enthalpy of less than 30 J/g, which mainly acts to increase flexibility of the material. The quantity of low crystallinity polymer is generally less than 70 wt %, and preferably of from 20 to 60 wt %, on the total weight of the thermoplastic material.

Preferably, the low crystallinity polymer is a copolymer of ethylene with a $C_3$–$C_{12}$ α-olefin, and possibly with a diene. The α-olefin is preferably selected from propylene, 1-hexene and 1-octene. If a diene comonomer is present, this is generally $C_4$–$C_{20}$, and is preferably selected from: conjugated or non-conjugated linear diolefins, such as 1,3-butadiene, 1,4-hexadiene, 1,6-octadiene or their mixtures and the like; monocyclic or polycyclic dienes, such as 1,4-cyclohexadiene, 5-ethylidene-2-norbornene, 5-methylene-2-norbornene, 5-vinyl-2-norbornene or their mixtures and the like.

Particularly preferred ethylene copolymers are:

(i) copolymers having the following monomer composition: 35–90 mol % of ethylene; 10–65 mol % of an α-olefin, preferably propylene; 0–10 mol % of a diene, preferably 1,4-hexadiene or 5-ethylene-2-norbornene (EPR and EPDM rubbers are within this class);

(ii) copolymers having the following monomer composition: 75–97 mol %, preferably 90–95 mol %, of ethylene; 3–25 mol %, preferably 5–10 mol %, of an α-olefin; 0–5 mol %, preferably 0–2 mol %, of a diene (for example ethylene/1-octene copolymers, such as the products Engage[R] of Dow-DuPont Elastomers).

The alkylaryl hydrocarbon of the invention preferably has a dielectric constant, at 25° C., of less than or equal to 3.5 and preferably less than 3 (measured in accordance with IEC 247).

According to a further preferred aspect, the alkylaryl hydrocarbon of the invention has a predetermined viscosity such as to prevent fast diffusion of the liquid within the insulating layer and hence its outward migration, while at the same time such as to enable it to be easily fed and mixed into the polymer. Generally, the dielectric liquid of the invention has a kinematic viscosity, at 20° C., of between 1 and 500 $mm^2/s$, preferably between 5 and 100 $mm^2/s$ (measured in accordance with ISO 3104).

According to a further preferred aspect, the alkylaryl hydrocarbon of the invention has a hydrogen absorption capacity greater than or equal to 5 $mm^3/min$, preferably greater than or equal to 50 $mm^3/min$ (measured in accordance with IEC 628-A).

According to a preferred aspect, an epoxy resin can be added to the dielectric liquid suitable for forming the cable of the invention, generally in a quantity of less than or equal to 1 wt % on the weight of the liquid, this being considered to mainly act to reduce the ion migration rate under an electrical field, and hence the dielectric loss of the insulating material.

In a preferred embodiment, the dielectric liquid of the invention comprises at least one alkylaryl hydrocarbon having at least three non-condensed aromatic rings.

Even more preferably, the dielectric liquid of the invention comprises at least one alkylaryl hydrocarbon having at least three non-condensed aromatic rings in a quantity of not less than 10 wt % on the total weight of the dielectric liquid.

Preferably, the dielectric liquid of the invention comprises at least one alkylaryl hydrocarbon having the structural formula:

(I)

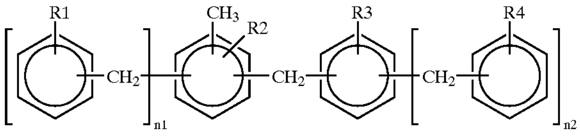

wherein:

R1, R2, R3 and R4, equal or different, are hydrogen or methyl;

n1 and n2, equal or different, are zero, 1 or 2, with the proviso that the sum n1÷n2 is less than or equal to 3.

The dielectric liquid can also contain minor quantities of at least one triphenylmethane, either unsubstituted or substituted by at least one radical selected from methyl, benzyl and methylbenzyl. Examples of triphenylmethanes are: ditoluylphenylmethane, dixylylphenylmethane, xylyltoluylphenylmethane and the like, or their mixtures.

More preferably, the dielectric liquid of the invention comprises at least one alkylaryl hydrocarbon of the aforegiven formula (I) in which the sum n1+n2 is other than zero.

Alkylaryl hydrocarbons corresponding to formula (I) in which the sum n1÷n2 is equal to zero, and usable advantageously in this invention, are for example: benzyltoluene, benzyxylene, (methylbenzyl)toluene, (methylbenzyl)xylene and the like, or their mixtures.

Alkylaryl hydrocarbons corresponding to formula (I) in which the sum n1+n2 is other than zero, and usable advantageously in this invention, are for example: dibenzyltoluene, dibenzylxylene, di(methylbenzyl)toluene, di(methylbenzyl)xylene and the like, or their mixtures.

The alkylaryl hydrocarbons of formula (I) are generally prepared by reacting benzylchloride, methylbenzychloride or their mixtures, with an aromatic hydrocarbon selected from benzene, toluene, xylene or their mixtures, in the presence of a Friedel-Crafts catalyst (for example $FeCl_3$, $SbCl_3$, $TiCl_4$ or $AlCl_3$). Further details regarding the preparation of alkylaryl hydrocarbons of formula (I) are given for example in U.S. Pat. No. 5,192,463, U.S. Pat. No. 5,446,228, U.S. Pat. No. 5,545,355 and U.S. Pat. No. 5,601,755.

The dielectric liquid suitable for implementing the invention has good heat resistance, considerable gas absorption capacity, in particular for hydrogen, and hence high resistance to partial discharges, so that dielectric loss is not high even at high temperature and high electrical gradient. The weight ratio of dielectric liquid to base polymer material of the invention is generally between 1:99 and 25:75, preferably between 2:98 and 20:80, and more preferably between 3:97 and 15:85.

According to a preferred aspect, the cable of the invention has at least one extruded covering layer with electrical insulation properties formed from the thermoplastic polymer material in admixture with the aforedescribed dielectric liquid.

According to a further preferred embodiment, the cable of the invention has at least one extruded covering layer with semiconductive properties formed from the thermoplastic polymer material in admixture with the aforedescribed dielectric liquid. To form a semiconductive layer, a conductive filler is generally added to the polymer material. To ensure good dispersion of the conductive filter within the base polymer material, this latter is preferably selected from propylene homopolymers or copolymers comprising at least 40 wt % of amorphous phase, on the total polymer weight.

In a preferred embodiment, the cable of the invention has at least one electrical insulation layer and at least one semiconductive layer fromed from a thermoplastic polymer material in admixture with a dielectric liquid as hereinabove described. This prevents the semiconductive layers from absorbing, with time, part of the dielectric liquid present in the insulating layer, so reducing its quantity just at the interface between the insulating layer and semiconductive layer, in particular the inner semiconductive layer where the electrical field is higher.

According to a further aspect, the invention relates to a polymer composition comprising a thermoplastic polymer material in admixture with a dielectric liquid, in which:

said thermoplastic material comprises a propylene homopolymer or a copolymer of propylene with at least one olefin comonomer selected from ethylene and an α-olefin other than propylene, said homopolymer or copolymer having a melting point of greater than or equal to 140° C. and a melting enthalpy of from 30 to 100 J/g;

said liquid comprises at least one alkylaryl hydrocarbon with at least two non-condensed aromatic rings and a ratio of number of aryl carbon atoms to total number of carbon atoms greater than or equal to 0.6, preferably greater than or equal to 0.7.

According to a further aspect, the invention relates to the use of a polymer composition, as described hereinabove, as the base polymer material for preparing a covering layer (4) with electrical insulation properties, or for preparing a covering layer (3, 5) with semiconductive properties.

In forming a covering layer for the cable of the invention, other conventional components can be added to the afore-defined polymer composition, such as antioxidants, processing aids, water tree retardants, and the like.

Conventional antioxidants suitable for the purpose are for example distearyl-thiopropionate and pentaerithryl-tetrakis [3-(3,5-di-tertburyl-4-hydroxyphenyl)propionate] and the like, or their mixtures.

Processing aids which can be added to the polymer base include, for example, calcium stearate, zinc stearate, stearic acid, paraffin wax and the like, or mixtures thereof.

With particular reference to medium and high voltage cables, the polymer materials as defined hereinabove can be advantageously used to form an insulating layer. As stated above, these polymer materials show indeed good mechanical characteristics both at ambient temperature and under hot conditions, and also show improved electrical properties. IN particular they enable high operating temperature to be employed, comparable with or even exceeding that of cables with coverings consisting of crosslinked polymer base materials.

If a semiconductor layer is to be formed, a conductive filler, in particular carbon black, is generally dispersed within the polymer material in a quantity such as to provide the material with semiconductive characteristics (i.e. such as to obtain a resistivity of less than 5 Ohm.m. at ambient temperature). This quantity is generally between 5 and 80 wt %, and preferably between 10 and 50 wt %, of the total weight of the mixture.

The possibility to use the same type of polymer composition for both the insulating layer and the semiconductive layers is particularly advantageous in producing cables for medium or high voltage, in that it ensures excellent adhesion between adjacent layers and hence better electrical behaviour, particularly at the interface between the insulating layer and the inner semiconductive layer, where the electrical field and hence the risk of partial discharges are higher.

The compositions of the invention can be prepared by mixing together the base polymer material, the dielectric liquid and any other additives possibly present by methods known in the art. Mixing can be carried out for example by an internal mixer of the type with tangential rotors (Banbury) or with interpenetrating rotors, or, preferably, in a continuous mixer of Ko-Kneader (Buss) type, or of co- or counter-rotating double-screw type.

Alternatively, the dielectric liquid of the invention can be added to the polymer material during the extrusion step by direct injection into the extruder cylinder.

According to the present invention, the use of the afore-defined polymer composition in covering cables for medium or high voltage enables recyclable, flexible coverings to be obtained with excellent mechanical and electrical properties.

Greater compatibility has also been found between the dielectric liquid and thermoplastic base polymer of the invention than in the case of similar mixtures of the same polymer material with other dielectric liquids known in the art. This greater compatibility leads, inter alia, to less exudation of the dielectric liquid and hence a reduction of the already discussed migration phenomena. Because of their high operating temperature and their low dielectric loss, the cables of the invention can carry, for the same voltage, a power at least equal to or even greater than that transportable by a traditional cable with XLPE covering.

For the purposes of the invention the term “medium voltage” generally means a voltage of between 1 and 35 kV, whereas “high voltage” means voltages higher than 35 kV.

Although this description is mainly focused on the production of cables for transporting or distributing medium or high voltage energy, the polymer composition of the invention can be used for covering electrical devices in general and in particular cables of different type, for example low voltage cables, telecommunications cables or combined energy/telecommunications cables, or accessories used in constructing electrical lines, such as terminals or connectors.

BRIEF DESCRIPTION OF THE DRAWING

Further characteristics will be apparent from the detailed description given hereinafter with reference to the accompanying drawing, in which.

DETAILED DESCRIPTION OF THE INVENTION

Figure 1:
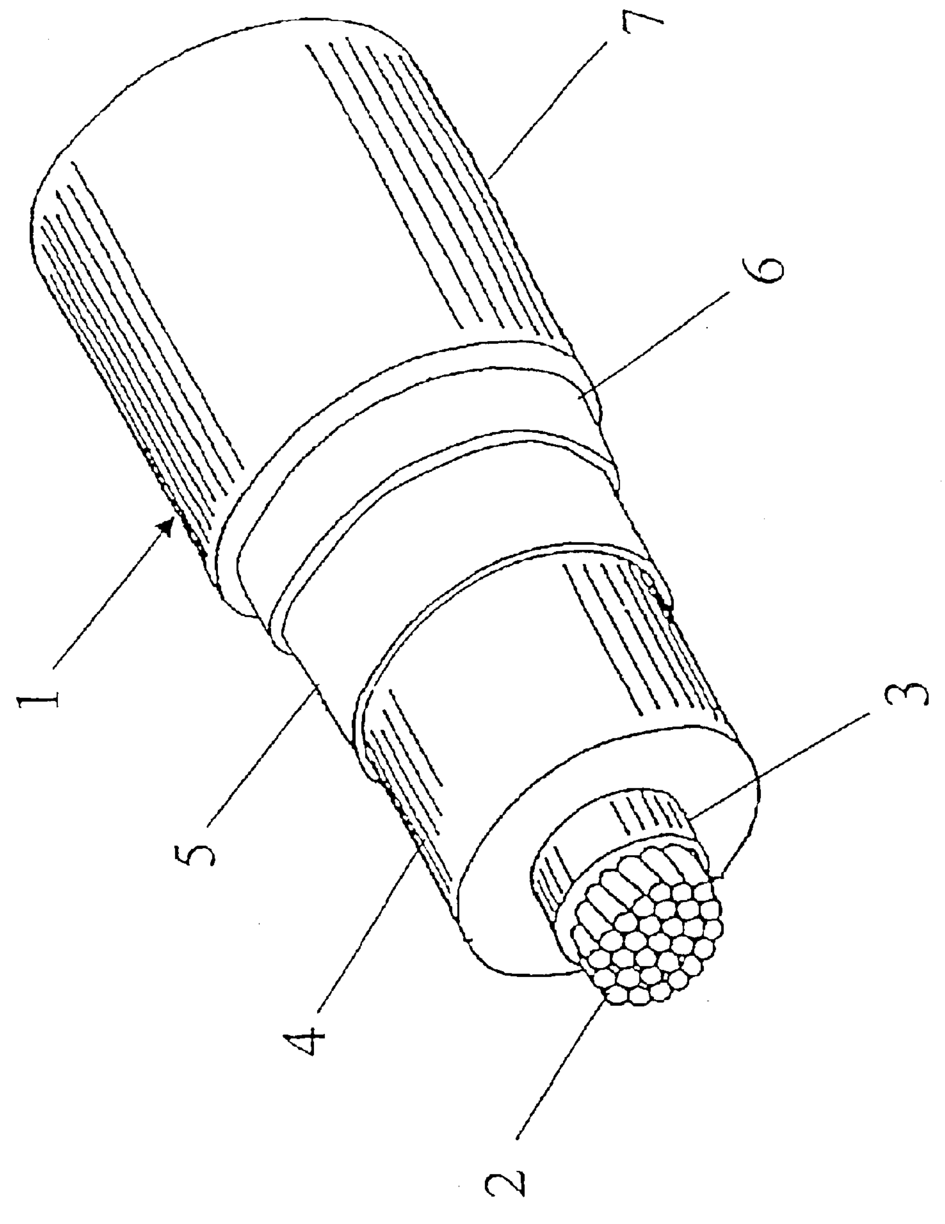
FIG. 1 is a perspective view of an electric cable, particularly suitable for medium or high voltage, according to the invention.

In FIG. 1, the cable 1 comprises a conductive 2, an inner layer with semiconductive properties 3, an intermediate layer with insulating properties 4, an outer layer with semiconductive properties 5, a metal screen 6, and an outer sheath 7.

The conductor 2 generally consists of metal wires, preferably of copper or aluminium, stranded together by conventional methods. At least one covering layer selected from the insulating layer 4 and the semiconductive layers 3 and 5 comprises the composition of the invention as heretofore defined. Around the outer semiconductive layer 5 there is usually positioned a screen 6, generally of electrically conducting wires or strips wound helically. This screen is then covered by a sheath 7 of a thermoplastic material, for example non-crosslinked polyethylene (PE) or preferably a propylene homopolymer or copolymer as heretofore defined.

The cable can also be provided with an outer protective structure (not shown in FIG. 1) the main purpose of which is to mechanically protect the cable against impact or compression. This protective structure can be, for example, a metal reinforcement or a layer of expanded polymer as described in WO 98/52197.

FIG. 1 shows only one possible embodiment of a cable according to the invention. Suitable modifications known in the art can evidently be made to this embodiment, but without departing from the scope of the invention.

The cable of the invention can be constructed in accordance with known methods for depositing layers of thermoplastic material, for example by extrusion. The extrusion is advantageously carried out in a single pass, for example by the tandem method in which individual extruders are arranged in series, or by co-extrusion with a multiple extrusion head.

The following examples illustrate the invention, but without limiting it.

EXAMPLES

Table 1 shows the characteristics of the dielectric liquids used in the following examples.

TABLE 1

| Dielectric liquid | Dielectric constant (*) | Total carbon atoms | Ratio C(aryl)/C(total) |
|---|---|---|---|
| Jarylec$^R$ Exp 4 | 2.8 | MXX = 16<br>DXX = 24 | 0.75 |
| Jarylec$^R$ Exp 3 | 2.7 | 21 | 0.86 |
| Baysilone$^R$ | 2.6 | — | — |

(*) at 25° C. in accordance with IEC 247

The dielectric liquids according to the invention were:

Jarylec$^R$Exp4 (commercial product of Elf Atochem):

a mixture containing 85 wt % of monoxylylxylene (MXX)

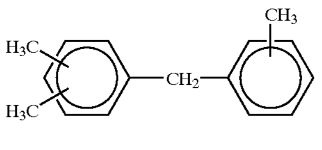

and 15 wt % of dixylylxylene (DXX)

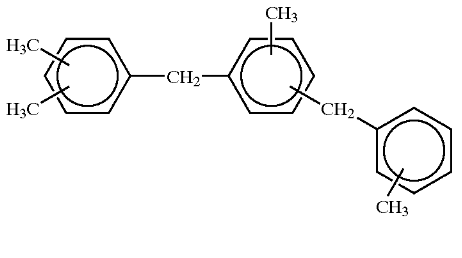

Jarylec$^R$Exp3 (commercial product of Elf Atochem):

dibenzyltoluene (DBT)

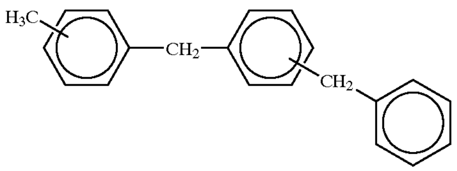

The comparison dielectric liquids were:

Baysilone$^R$PD5 (commercial product of General Electric—Bayer):

polyphenylmethylsiloxane (PPMS), polyaromatic dielectric oil as described in IEE Transactions on Electrical Insulation Vol. 26, No. 4, 1991, having a viscosity of 4 $mm^2$/sec at 25° C.;

Flexon$^R$641 (commercial product of Esso):

naphthene-based aromatic oil having a viscosity of 22 $mm^2$/sec at 40° C., consisting of 40 wt % aromatic hydrocarbons, 57 wt % saturated hydrocarbons and 3 wt % polar compounds.

The following polymer materials were used:

a flexible propylene homopolymer with melting point 160° C., melting enthalpy 56.7 J/g, MFI 1.8 kg/min and flexural modulus 290 MPa (Rexflex$^R$WL105—commercial product of Huntsman Polymer Corp.)

(Examples 1–6)

a propylene heterophase copolymer with an ethylene/propylene elastomeric phase content of about 65 wt % (propylene 72 wt % in the elastomeric phase), melting enthalpy 32 J/g, melting point 163° C., MFI 0.8 dg/min and flexural modulus of about 70 MPa (Hifax$^R$KSO81—commercial product of Montell).

Composition Preparation

The polymer in granular form was preheated at 80° C. in a turbomixer. The dielectric liquid was added, in the quantities specified for the formulations given in Table 2, to the polymer preheated in the turbomixer under agitation at 80° C. over 15 min. After the addition agitation was continued for a further hour at 80° C. until the liquid was completely absorbed in the polymer granules.

After this first stage, the resultant material was kneaded in a laboratory double-screw Brabender. Plasticorder PL2000 at a temperature of 185° C. to complete homogenization. The material left the double-screw mixer in the form of granules.

Measurement of Dielectric Strength (DS)

The dielectric strength of the polymer compositions obtained was evaluated on test-pieces of insulating material having the geometry proposed by the EFI (Norwegian Electric Power Research Institute) in the publication "The EFI Test Method for Accelerated Growth of Water Trees" (IEEE International Symposium on Electrical insulation, Toronto, Canada, Jun. 3–6, 1990). In this method, the cable is simulated with glass-shaped test pieces of insulating material having their base coated on both sides with a semiconductive material coating.

The glass-shaped test-pieces were formed by moulding discs of insulating material at 160–170° C. from a plate of thickness 10 mm obtained by compressing granules at about 190° C.

The inner and outer surfaces of the base, which had a thickness of about 0.40–0.45 mm, were coated with a semiconductive coating. The DS measurement was made by applying to these specimens, immersed in silicone oil at 20° C., an alternating current at 50 Hz starting with a voltage of 25 kV and increasing in steps of 5 kV every 30 minutes until perforation of the test-piece occurred. Each measurement was repeated on 10 test-pieces. The values given in Table 2 are the arithmetic mean of the individual measured values.

TABLE 2

| Ex. | Polymer | Dielectric liquid | % dielectric liquid by weight | DS (mean) |
|---|---|---|---|---|
| 1* | Rexflex[R] WL 105 | — | — | 92 |
| 2* | Rexflex[R] WL 105 | Baysilone[R] PD5 | 5 | 90 |
| 3* | Rexflex[R] WL 105 | Flexon[R]641 | 5 | 94 |
| 4 | Rexflex[R] WL 105 | Jarylec[R] Exp4 | 6 | 128 |
| 5 | Rexflex[R] WL 105 | Jarylec[R] EXP4 | 15 | 150 |
| 6 | Rexflex[R] WL 105 | Jarylec[R] Exp3 | 4 | 143 |
| 7* | Hifax[R] KS081 | — | — | 90 |
| 8 | Hifax[R] KS081 | Jarylec[R] Exp4 | 15 | 140 |

*comparison

The dielectric strength values given in Table 2 highlight the improvement in electrical performance deriving from the dielectric liquids of the invention, compared to that of the base polymer as such or when mixed with the comparison dielectric liquids.

Migration Tests

Using the polymer/dielectric liquid compositions prepared in Examples 5 and 6 moulded into 5 mm plates at 190° C., the loss of dielectric liquid (expressed as percentage by weight on the initial quantity) was measured against time at 20° C. in air in order to verify the diffusivity of the dielectric liquids in the polymer and hence their stability with time in these compositions.

TABLE 3

| Days | Composition Example 6 | Composition Example 3 |
|---|---|---|
| 0 | 100.00 | 100.00 |
| 1 | 100.00 | 99.84 |
| 4 | 99.97 | 99.32 |
| 5 | 99.97 | 99.14 |
| 6 | 99.97 | 99.14 |
| 8 | 99.75 | 98.6 |
| 12 | 99.45 | 97.91 |
| 18 | 99.34 | 96.69 |
| 28 | 99.24 | 94.92 |
| 39 | 99.14 | 93.54 |

The data of FIG. 3 show the high compatibility of the dielectric liquids with the described base polymer material and consequently the low tendency of these liquids to migrate to the outside of the polymer material.

What is claimed is:

1. A cable comprising at least one electrical conductor and at least one extruded covering layer based on a thermoplastic polymer material in admixture with a dielectric liquid, wherein:

said thermoplastic material comprises a propylene homopolymer or a copolymer of propylene with at least an olefin comonomer selected from ethylene and an α-olefin other than propylene, said homopolymer or copolymer having a melting point greater than or equal to 140° C. and a melting enthalpy of from 30 to 100 J/g; and said liquid comprises at least one alkylaryl hydrocarbon with at least two non-condensed aromatic rings and a ratio of number of aryl carbon atoms to total number of carbon atoms greater than or equal to 0.6.

2. A cable as claimed in claim 1, wherein the ratio of number of aryl carbon atoms to total number of carbon atoms is greater than or equal to 0.7.

3. A cable as claimed in claim 1, wherein the propylene homopolymer or copolymer has a melting point of from 145 to 170° C.

4. A cable as claimed in claim 1, wherein the propylene homopolymer or copolymer has a melting enthalpy of from 30 to 85 J/g.

5. A cable as claimed in claim 1, wherein the propylene homopolymer or copolymer has a flexural modulus, measured at ambient temperature, of from 30 to 1400 MPa.

6. A cable as claimed in claim 1, wherein the propylene homopolymer or copolymer has a flexural modulus, measured at ambient temperature, of from 60 to 1000 MPa.

7. A cable as claimed in claim 1, wherein the propylene homopolymer or copolymer has a melt flow index, measured at 230° C., of from 0.5 to 10.0 dg/min.

8. A cable as claimed in claim 1, wherein the propylene homopolymer or copolymer has a melt flow index, measured at 230° C., of from 0.5 to 5.0 dg/min.

9. A cable as claimed in claim 1, wherein the olefin comonomer is present in a quantity of less than or equal to 15 mol %.

10. A cable as claimed in claim 1, wherein the olefin comonomer is present in a quantity of less than or equal to 10 mol %.

11. A cable as claimed in claim 1, wherein the olefin comonomer is ethylene or an α-olefin of formula $CH_2{=}CH{-}R$, wherein R is a linear or branched $C_2$–$C_{10}$ alkyl.

12. A cable as claimed in claim 11, wherein the α-olefin is selected from 1-butene, 1-pentene, 4-methyl-1-pentene, 1-hexene, 1-octene, 1-decene, 1-dodecene or combinations thereof.

13. A cable as claimed in claim 2, wherein the thermoplastic material is selected from:

a) a propylene homopolymer or a copolymer of propylene with at least one olefin comonomer selected from ethylene and an α-olefin other than propylene, having a flexural modulus of from 30 to 900 MPa; and b) a heterophase copolymer comprising a thermoplastic phase based on propylene and an elastomeric phase based on ethylene copolymerized with an α-olefin, in which the elastomeric phase is present in a quantity of at least 45 wt % based on the total weight of the heterophase copolymer.

14. A cable as claimed in claim 13, wherein the propylene homopolymer or copolymer under a) has a flexural modulus of from 50 to 400 MPa.

15. A cable as claimed in claim 13, wherein the propylene homopolymer or copolymer under a) has:

a melting point of from 140 to 165° C.;

a melting enthalpy of from 30 to 80 J/g;

a fraction soluble in boiling diethyl ether in an amount of less than or equal to 12 wt %, having a melting enthalpy of less than or equal to 4 J/g;

fraction soluble in boiling n-heptane in an amount of from 15 to 60 wt %, having a melting enthalpy from 10 to 40 J/g; and a fraction insoluble in boiling n-heptane in an amount of from 40 to 85 wt %, having a melting enthalpy of greater than or equal to 45 J/g.

16. A cable as claimed in claim 13, wherein the propylene homopolymer or copolymer of a) has:

a fraction solution in boiling diethyl ether in an amount of from 1 to 10 wt %, having a melting enthalpy of less than or equal to 2 J/g;

a fraction soluble in boiling n-heptane in an amount of from 20 to 50 wt %, having a melting enthalpy of from 15 to 30 J/g; and a fraction insoluble in boiling n-heptane in an amount of from 50 to 80 wt %, having a melting enthalpy from 50 to 95 J/g.

17. A cable as claimed in claim 13, wherein the $\alpha$-olefin included in the elastomeric phase of the heterophase copolymer under b) is propylene.

18. A cable as claimed in claim 17, wherein the elastomeric phase consists of an elastomeric copolymer of ethylene and propylene comprising from 15 to 50 wt % of ethylene and from 50 to 85 wt % of propylene based on the weight of the elastomeric phase.

19. A cable as claimed in claim 1, wherein a base thermoplastic material is the propylene homopolymer or copolymer of propylene in mechanical mixture with a low crystallinity polymer having a melting enthalpy of less than or equal to 30 J/g, and a quantity of less than or equal to 70 wt % based on the total weight of the thermoplastic material.

20. A cable as claimed in claim 19, wherein the low crystallinity polymer is in a quantity of from 20 to 60 wt % based on the total weight of the thermoplastic material.

21. A cable as claimed in claim 19, wherein the low crystallinity polymer is a copolymer of ethylene with a $C_3$–$C_{12}$ $\alpha$-olefin.

22. A cable as claimed in claim 19, wherein the low crystallinity polymer is a copolymer of ethylene with an $\alpha$-olefin and a diene.

23. A cable as claimed in claim 21 or 22, wherein the ethylene copolymer is selected from i) a copolymer having the following monomer composition: 35–90 mol % of ethylene; 10–65 mol % of $\alpha$-olefin; and 0–10 mol % of a diene; or ii) a copolymer having the following monomer composition: 75–97 mol % of ethylene; 3–25 mol % of $\alpha$-olefin; and 0–5 mol % of a diene.

24. A cable as claimed in claim 23, wherein the ethylene copolymer is selected from a copolymer having the following monomer composition: 90–85 mol % of ethylene; 5–10 mol % of $\alpha$-olefin; and 0–2 mol % of a diene.

25. A cable as claimed in claim 21, wherein the $\alpha$-olefin is selected from propylene, 1-hexene and 1-octene.

26. A cable as claimed in claim 22, wherein the diene has from 4 to 20 carbon atoms.

27. A cable as claimed in claim 22, wherein the diene is selected from a conjugated or non-conjugated linear diolefin, and a monocyclic or polycyclic diene.

28. A cable as claimed in claim 22, wherein the diene is selected from 1,3-butadiene, 1,4-hexadiene, 1,6-octadiene, 1,4-cyclohexadiene, 5-ethylidene-2-norbornene, 5-methylene-2-norbornene, 5-vinyl-2-norbornene, or their mixtures.

29. A cable as claimed in claim 1, wherein the alkylaryl hydrocarbon has a dielectric constant at 25° C. of less than or equal to 3.5.

30. A cable as claimed in claim 1, wherein the dielectric constant at 25° C. is less than or equal to 3.

31. A cable as claimed in claim 1, wherein the dielectric liquid has a kinematic viscosity at 20° C. of between 1 and 500 $mm^2$/s.

32. A cable as claimed in claim 1, wherein the dielectric liquid has a kinematic viscosity at 20° C. of between 5 and 100 $mm^2$/s.

33. A cable as claimed in claim 1, wherein the alkylaryl hydrocarbon has a hydrogen absorption capacity of greater than or equal to 5 $mm^3$/min.

34. A cable as claimed in claim 33, wherein the hydrogen absorption capacity is greater than or equal to 50 $mm^3$/min.

35. A cable as claimed in claim 1, further comprising an epoxy resin added to the dielectric liquid in a quantity of less than or equal to 1 wt % based on the weight of the liquid.

36. A cable as claimed 35, wherein the alkylaryl hydrocarbon is present in a quantity of greater than or equal to 10 wt % based on the total weight of the dielectric liquid.

37. A cable as claimed in claim 1, wherein the dielectric liquid comprises at least one alkylaryl hydrocarbon having at least three non-condensed aromatic rings.

38. A cable as claimed in claim 1, wherein the alkylaryl hydrocarbon has the structural formula:

(I)

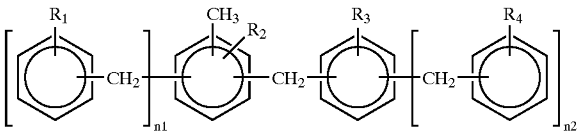

where:

$R_1$, $R_2$, $R_3$ and $R_4$, equal or different, are hydrogen or methyl;

n1 and n2, equal or different, are zero, 1 or 2, with the proviso that the sum n1+n2 is less than or equal to 3.

39. A cable as claimed in claim 1, wherein the alkylaryl hydrocarbon is selected from benzyltoluene, benzylxylene, (methylbenzyl)toluene, (methylbenzyl)xylene, dibenzyltoluene, dibenzylxylene, di(methylbenzyl)toluene, di(methylbenzyl)xylene, or their mixtures.

40. A cable as claimed in claim 1, wherein the dielectric liquid comprises at least one triphenylmethane, either unsubstituted or substituted by at least one radical selected from methyl, benzyl and methylbenzyl.

41. A cable a claimed in claim 40, wherein the triphenylmethane is selected from ditoluylphenylmethane, dixylylphenylmethane, xylyltoluylphenylmethane, or their mixtures.

42. A cable as claimed in claim 1, wherein the weight ratio of dielectric liquid to base polymer material is 1:99 to 25:75.

43. A cable as claimed in claim 1, wherein the weight ratio of dielectric liquid to base polymer material is from 2.98 to 20:80.

44. A cable as claimed in claim 1, wherein the weight ratio of dielectric liquid to base polymer material is from 3:97 to 15:85.

45. A cable as claimed in claim 1, wherein the extruded covering layer is a layer with electrical insulation properties.

46. A cable as claimed in claim 1, wherein the extruded covering layer is a layer with semiconductive properties.

47. A cable as claimed in claim 46, wherein the conductive filler is dispersed in the layer with semiconductive properties.

48. A cable as claimed in claim 1, wherein the base polymer material is selected from propylene homopolymers or copolymers comprising at least 40 wt % of amorphous phase, based on the total polymer weight.

49. A cable as claimed in claim 1, wherein at least one layer with electrical insulation properties and at least one layer with semiconductive properties are present.

50. A copolymer composition comprising a thermoplastic polymer material which comprises a propylene homopolymer or a copolymer of propylene with at least an olefin comonomer selected from ethylene and an α-olefin other than propylene, said homopolymer or copolymer having a melting point greater than or equal to 140° C. and a melting enthalpy of from 30 to 100 J/g, in admixture with a dielectric liquid which comprises at least one alkylaryl hydrocarbon with at least two non-condensed aromatic rings and a ratio of number of aryl carbon atoms to total number of carbon atoms of greater than or equal to 0.6.

51. A cable as claimed in claim 22, wherein the α-olefin is selected from propylene, 1-hexene and 1-octene.

* * * * *

UNITED STATES PATENT AND TRADEMARK OFFICE

CERTIFICATE OF CORRECTION

PATENT NO. : 6,908,673 B2
DATED : June 21, 2005
INVENTOR(S) : Luca Castellani et al.

It is certified that error appears in the above-identified patent and that said Letters Patent is hereby corrected as shown below:

Title page,
Item [75], Inventors, "Cristiana Scelza, Lucania (IT)" should read -- Cristiana Scelza, Angellara Di Vallo Della Lucania (IT) --.

Column 12,
Line 39, "claim 2," should read -- claim 1, --.
Line 62, before "fraction", insert -- a --.

Column 13,
Line 3, "solution" should read -- soluble --.
Line 46, "90-85" should read -- 90-95 --.

Column 14,
Line 12, "as claimed 35," should read -- as claimed in claim 35, --.
Line 42, "a claimed" should read -- as claimed --.

Signed and Sealed this

Fourth Day of October , 2005

JON W. DUDAS
*Director of the United States Patent and Trademark Office*